(12) United States Patent
Telefus et al.

(10) Patent No.: US 8,441,810 B2
(45) Date of Patent: May 14, 2013

(54) CASCADE POWER SYSTEM ARCHITECTURE

(75) Inventors: Mark Telefus, Orinda, CA (US); Bahman Sharifipour, Westford, MA (US)

(73) Assignee: Flextronics AP, LLC, Broomfield, CO (US)

( * ) Notice: Subject to any disclaimer, the term of this patent is extended or adjusted under 35 U.S.C. 154(b) by 316 days.

(21) Appl. No.: 12/942,333

(22) Filed: Nov. 9, 2010

(65) Prior Publication Data

US 2012/0113692 A1     May 10, 2012

(51) Int. Cl.
*H02M 3/335*     (2006.01)

(52) U.S. Cl.
USPC .......................................... 363/17; 363/132

(58) Field of Classification Search ............. 363/17.132, 363/123, 16, 17, 131
See application file for complete search history.

(56) References Cited

U.S. PATENT DOCUMENTS

| | | |
|---|---|---|
| 4,184,197 A | 1/1980 | Cuk et al. |
| 4,273,406 A | 6/1981 | Okagami |
| 4,370,703 A | 1/1983 | Risberg |
| 4,563,731 A | 1/1986 | Sato |
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |
| 4,823,249 A | 4/1989 | Garcia, II |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

Notice of Allowance re. U.S. Appl. No. 12/687,761, filed Jan. 14, 2010, 7 pages.

(Continued)

*Primary Examiner* — Adolf Berhane
(74) *Attorney, Agent, or Firm* — Haverstock & Owens LLP (57) ABSTRACT

A cascade power system comprises a non-isolated converter in a cascade configuration with an isolated converter and a controller that is coupled with the output of the isolated converter and the switching element of the non-isolated converter. The non-isolated converter steps-down the input voltage to a lower regulated voltage. The isolated converter converts the regulated voltage to a square wave signal that is output to a transformer and the controller. Thus, a the resulting feedback loop comprising the isolated converter, controller and non-isolated converter is completely independent from the output of the system. As a result, a feedback relation can be derived in the form of a feedback algorithm that can effectively regulate/adjust the output of the non-isolated converter and therefore the isolated converter output as well. Further, because the non-isolated converter steps down the voltage and the isolated converter operates on this low stepped down voltage, the system is able to be highly efficient.

46 Claims, 4 Drawing Sheets

U.S. PATENT DOCUMENTS

| | | | |
|---|---|---|---|
| 5,065,302 | A | 11/1991 | Kanazawa |
| 5,090,919 | A | 2/1992 | Tsuji |
| 5,101,322 | A | 3/1992 | Ghaem et al. |
| 5,132,890 | A | 7/1992 | Blandino |
| 5,235,491 | A | 8/1993 | Weiss |
| 5,325,283 | A | 6/1994 | Farrington |
| 5,365,403 | A | 11/1994 | Vinciarelli et al. |
| 5,373,432 | A | 12/1994 | Vollin |
| 5,442,540 | A | 8/1995 | Hua |
| 5,673,185 | A | 9/1997 | Albach et al. |
| 5,712,772 | A | 1/1998 | Telefus et al. |
| 5,790,395 | A | 8/1998 | Hagen |
| 5,811,895 | A | 9/1998 | Suzuki et al. |
| 5,838,554 | A | 11/1998 | Lanni |
| 5,859,771 | A | 1/1999 | Kniegl |
| 5,905,369 | A | 5/1999 | Ishii et al. |
| 5,923,543 | A | 7/1999 | Choi |
| 5,949,672 | A | 9/1999 | Bertnet |
| 6,091,611 | A | 7/2000 | Lanni |
| 6,188,302 | B1 | 2/2001 | Daikhuara et al. |
| 6,272,015 | B1 | 8/2001 | Mangtani |
| 6,275,397 | B1 | 8/2001 | McClain |
| 6,323,627 | B1 | 11/2001 | Schmiederer et al. |
| 6,385,059 | B1 | 5/2002 | Telefus et al. |
| 6,388,897 | B1 | 5/2002 | Ying |
| 6,390,854 | B2 | 5/2002 | Yamamoto et al. |
| 6,452,816 | B2 | 9/2002 | Kuranuki |
| 6,459,175 | B1 | 10/2002 | Potega |
| 6,487,098 | B2 | 11/2002 | Malik et al. |
| 6,549,409 | B1 | 4/2003 | Saxelby et al. |
| 6,578,253 | B1 | 6/2003 | Herbert |
| 6,618,274 | B2 | 9/2003 | Boylan et al. |
| 6,654,261 | B2 | 11/2003 | Welches et al. |
| 6,721,192 | B1 | 4/2004 | Yang et al. |
| 6,775,162 | B2 | 8/2004 | Mihai et al. |
| 6,894,461 | B1 | 5/2005 | Hack et al. |
| 6,899,434 | B2 | 5/2005 | Morishita |
| 6,919,715 | B2 | 7/2005 | Muratov et al. |
| 6,989,997 | B2 | 1/2006 | Xu |
| 7,035,126 | B1 | 4/2006 | Lanni |
| 7,038,406 | B2 | 5/2006 | Wilson |
| 7,102,251 | B2 | 9/2006 | West |
| 7,139,180 | B1 | 11/2006 | Herbert |
| 7,202,640 | B2 | 4/2007 | Morita |
| 7,208,833 | B2 | 4/2007 | Nobori et al. |
| 7,212,420 | B2 | 5/2007 | Liao |
| 7,239,532 | B1 | 7/2007 | Hsu et al. |
| 7,274,175 | B2 | 9/2007 | Manolescu |
| 7,386,286 | B2 | 6/2008 | Petrovic et al. |
| 7,450,388 | B2 | 11/2008 | Beihoff et al. |
| 7,499,301 | B2 | 3/2009 | Zhou |
| 7,545,256 | B2 | 6/2009 | O'Toole et al. |
| 7,564,706 | B1 | 7/2009 | Herbert |
| 7,596,007 | B2 | 9/2009 | Phadke |
| 7,701,305 | B2 | 4/2010 | Lin et al. |
| 8,102,678 | B2 * | 1/2012 | Jungreis ............ 363/21.03 |
| 2002/0008963 | A1 | 1/2002 | DiBene, II et al. |
| 2002/0011823 | A1 | 1/2002 | Lee |
| 2002/0036200 | A1 | 3/2002 | Ulrich |
| 2003/0035303 | A1 | 2/2003 | Balakrishnan et al. |
| 2004/0183510 | A1 | 9/2004 | Sutardja et al. |
| 2004/0252529 | A1 | 12/2004 | Huber et al. |
| 2005/0024016 | A1 | 2/2005 | Breen et al. |
| 2005/0036338 | A1 | 2/2005 | Porter et al. |
| 2005/0117376 | A1 | 6/2005 | Wilson |
| 2005/0138437 | A1 | 6/2005 | Allen et al. |
| 2005/0194942 | A1 | 9/2005 | Hack et al. |
| 2005/0225257 | A1 | 10/2005 | Green |
| 2005/0254268 | A1 | 11/2005 | Reinhard et al. |
| 2006/0002155 | A1 | 1/2006 | Shteynberg et al. |
| 2006/0022637 | A1 | 2/2006 | Wang et al. |
| 2006/0109696 | A1 | 5/2006 | Ren et al. |
| 2006/0152947 | A1 | 7/2006 | Baker |
| 2006/0213890 | A1 | 9/2006 | Kooken et al. |
| 2007/0040516 | A1 * | 2/2007 | Chen ............................ 315/291 |
| 2007/0051712 | A1 | 3/2007 | Kooken et al. |
| 2007/0138971 | A1 | 6/2007 | Chen |
| 2007/0247091 | A1 | 10/2007 | Maiocchi |
| 2007/0247877 | A1 | 10/2007 | Kwon et al. |
| 2007/0263415 | A1 | 11/2007 | Jansen et al. |
| 2008/0043496 | A1 | 2/2008 | Yang |
| 2008/0191667 | A1 | 8/2008 | Kernahan et al. |
| 2009/0290384 | A1 | 11/2009 | Jungreis |
| 2009/0290385 | A1 | 11/2009 | Jungreis et al. |
| 2010/0039833 | A1 | 2/2010 | Coulson et al. |
| 2010/0322441 | A1 | 12/2010 | Weiss et al. |
| 2011/0261590 | A1 | 10/2011 | Liu |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

International Search Report dated Mar. 2, 2012, International Application No. PCT/US2011/059800, International Filing Date: Nov. 8, 2011, 12 pages.

EE Times.com—"Teams Claim Midrange Wireless Energy Transfer", by R. Colin Johnson, 4 pages, Nov. 6, 2007.

EE Times.com—"Wireless Beacon Could Recharge Consumer Devices", by R. Colin Johnson, 3 pages, Nov. 6, 2007.

Hang-Seok Choi et al., Novel Zero-Voltage and Zero-Current-Switching (ZVZCS) Full-Bridge PWM Converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171, Cambridge, MA02139, pp. 4074-4084.

"Randomized Modulation in Power Electronic Converters", Aleksander M. Stankovic, member IEEE, and Hanoch Lev-Ari, vol. 90, No. 5, May 2002, pp. 782-799.

"Analysis and Special Characteristics of a Spread-Spectrum technique for Conducted EMI Suppression", K.K. Tse, et al., Member IEEE, IEEE Transactions on Power Electronics, vol. 15., No. 2, Mar. 2000, pp. 399-410.

International Search Report, PCT/US2011/49438, International filing date Aug. 26, 2011, 10 pages.

* cited by examiner

CASCADE POWER SYSTEM ARCHITECTURE

FIELD OF THE INVENTION

The present invention relates to the field of power converters. More particularly, the present invention relates to a cascade power system architecture for power converters.

BACKGROUND

Presently, there is a high demand for efficient power converters that address the power needs of commercial products such as computers and cell phones. As a result, multiple different isolated power converter topologies have been developed to meet this ever increasing demand such as flyback, half-bridge and full-bridge converters. Further, to address power factor correction (PFC) concerns while still isolating the main power supply from the output, the prior art has progressed primarily toward numerous "two-stage" power converters wherein the first stage comprises a non-isolated boost converter and the second stage comprises an isolated converter such as the flyback, half-bridge and full-bridge converters. This is primarily because boost and half-bridge converters have a common ground with the controller IC, and therefore a simple way to close the feedback loop. However, these "two-stage" power converters have the drawbacks of increased design complexity, decreased energy conversion efficiency, increased component counts, increased printed circuit board (PCB) size, and therefore increased cost.

Figure 1:
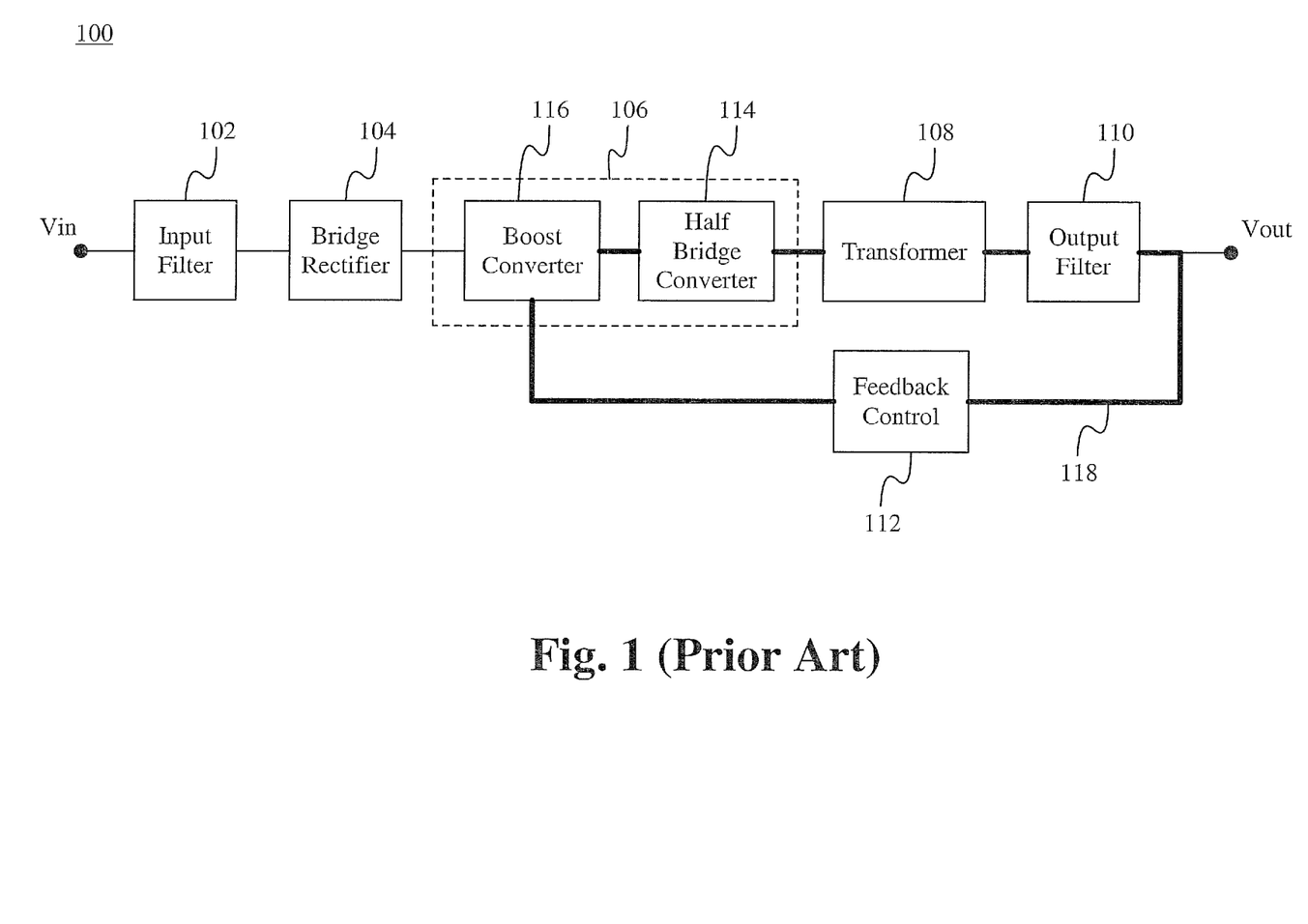
FIG. 1 illustrates a functional block diagram of a prior art power apparatus.

A block diagram of a prior art regulated power apparatus 100 is shown in FIG. 1. The apparatus 100 is a two stage boost half-bridge power converter. The apparatus 100 generally includes an input filter 102, a rectifier 104, a two stage converter 106 comprising a boost converter 116 (first stage) and a half bridge converter 114 (second stage), a transformer 108, an output filter 110 and a feedback control 112.

The input filter 102 is coupled to receive an AC input signal Vin and to filter out electromagnetic and radio frequency interference/noise. The input filter 102 outputs a filtered AC signal to the rectifier 104. Upon receiving the signal, the rectifier 104 generates an unregulated direct current (DC) voltage and outputs that unregulated DC voltage to the coupled input of the boost converter 116. Typically, the boost converter 116 receives the unregulated DC voltage from the rectifier 104 and generates a boosted or increased voltage. This increased voltage is a regulated DC voltage that is greater than the input unregulated DC voltage. It should be noted that it is well known in the art that unregulated voltage is voltage that is allowed to vary with changes in the load of the circuit and/or changes in the power source voltage. Correspondingly, it is also well known in the art that regulated voltage is voltage that is controlled such that a sufficiently constant output voltage is maintained despite load and/or power source variation. The half bridge regulator 114 receives the increased regulated voltage and generates a "chopped" DC signal that is ideally a square wave signal that is output across the inputs to the transformer 108. (Is this inherently a "square wave signal" or can it be other types of wave signals?) The transformer 108 converts the DC square wave to a desired output voltage depending on the turn ratio of the transformer 108. Often the desired output voltage is 5, 12 or 24V. The AC voltage signal output from the transformer 108 is input to an output filter 110, which filters out harmonic noise due to the power circuit 100 and converts the AC signal to DC. The DC voltage signal Vout is output to an electrical device (not shown) and a controller 112. The controller 112 senses a power change in the DC voltage signal Vout and controls a duty cycle of a regulation switching element within the boost regulator 114 to supply a compensating power to correct the power change in the DC voltage signal Vout.

One disadvantage of this type of power system is that due to regulations requiring isolation of the main power supply and powered electrical devices, the controller 112 includes isolating topology often comprising devices such as optocouplers. This results in increased design complexity, decreased energy conversion efficiency, increased component counts, increased PCB size, and therefore increased cost.

SUMMARY OF THE INVENTION

A cascade power system comprises a non-isolated step-down converter in a cascade configuration with an isolated converter and a controller that is coupled to the output of the isolated converter and a switching element of the non-isolated converter. The non-isolated converter steps-down the input voltage to a lower regulated voltage. The isolated converter converts the regulated voltage to a square wave signal that is output to a transformer and the controller. Thus, a feedback loop comprising the isolated converter, the controller and the non-isolated converter is completely independent from the output of the system. As a result, a feedback relation can be derived in the form of a feedback algorithm that can effectively regulate/adjust the output of the non-isolated converter and therefore the isolated converter output as well. Further, because the non-isolated converter steps down the voltage and the isolated converter operates on this low stepped down voltage, the system is able to be highly efficient.

In accordance with a first aspect, the present application relates to a cascade power apparatus. The apparatus comprises a non-isolated converter having a switching element, wherein the non-isolated converter receives a rectified power signal having an unregulated voltage and generates a regulated voltage, an isolated converter coupled with the non-isolated converter for receiving the regulated voltage and generating a converted voltage, a transformer coupled with the isolated converter for receiving the converted voltage and generating an output voltage and an internal controller coupled with an output of the isolated converter for receiving the converted voltage and generating a control signal for adjusting the switching element based on a feedback algorithm, wherein the feedback algorithm is independent of the output voltage. The non-isolated converter is a step-down converter and the regulated voltage is lower than the unregulated voltage. Alternatively, the non-isolated converter is a step-up converter and the regulated voltage is higher than the unregulated voltage. The converted voltage is lower than the regulated voltage. The converted voltage is a square wave voltage. The non-isolated step-down converter is a buck converter. The isolated converter is a half-bridge converter. In some embodiments, the cascade power apparatus further comprises a rectifier for receiving an AC input signal and generating the rectified power signal having the unregulated rectified voltage. The rectifier is a diode bridge. In some embodiments, the cascade power apparatus further comprises an input filter for filtering out electromagnetic and radio frequency interference from the AC input signal. In some embodiments, the cascade power apparatus further comprises an output filter for filtering out electromagnetic and radio frequency interference from the output voltage. Adjustment to the switching element controls the output of the non-isolated converter by adjusting a duty cycle of the non-isolated converter.

In accordance with another aspect of the present application, a cascade power system comprises an electronic device for receiving an output voltage, a power supply for generating an AC input signal and a power converter coupled between the power supply and the electronic device comprising a rectifier for receiving the AC input signal and generating a rectified power signal having an unregulated rectified voltage, a non-isolated converter having a switching element, wherein the non-isolated converter receives the unregulated voltage and generates a regulated voltage, an isolated converter coupled with the non-isolated converter for receiving the regulated voltage and generating a converted voltage, a transformer coupled with the isolated converter for receiving the converted voltage and generating the output voltage and an internal controller coupled with an output of the isolated converter for receiving the converted voltage and generating a control signal for adjusting the switching element based on a feedback algorithm, wherein the feedback algorithm is independent of the output voltage. The non-isolated converter is a step-down converter and the regulated voltage is lower than the unregulated voltage. Alternatively, the non-isolated converter is a step-up converter and the regulated voltage is higher than the unregulated voltage. The converted voltage is lower than the regulated voltage. The converted voltage is a square wave voltage. The non-isolated step-down converter is a buck converter. The isolated converter is a half-bridge converter. The rectifier is a diode bridge. In some embodiments, the system further comprises an input filter for filtering out electromagnetic and radio frequency interference from the AC input signal. In some embodiments, the system further comprises an output filter for filtering out electromagnetic and radio frequency interference from the output voltage. Adjustment to the switching element controls the output of the non-isolated converter by adjusting a duty cycle of the non-isolated converter.

Another aspect of the present application is directed to a method of regulating a cascade power apparatus. The method comprises receiving an unregulated rectified voltage at a non-isolated converter comprising a switching element and generating regulated voltage, receiving the regulated voltage at an isolated converter and generating a converted voltage, receiving the converted voltage at a transformer and generating an output voltage and receiving the converted voltage at an internal controller and generating a control signal that adjusts the switching element based on a feedback algorithm, wherein the feedback algorithm is independent of the output voltage. The non-isolated converter is a step-down converter and the regulated voltage is lower than the unregulated voltage. Alternatively, the non-isolated converter is a step-up converter and the regulated voltage is higher than the unregulated voltage. The converted voltage is lower than the regulated voltage. The converted voltage is a square wave voltage. The non-isolated step-down converter is a buck converter. The isolated converter is a half-bridge converter. In some embodiments, the method further comprises receiving an AC input signal at a rectifier and generating an rectified power signal having the unregulated rectified voltage. The rectifier is a diode bridge. In some embodiments, the method further comprises filtering out electromagnetic and radio frequency interference from the AC input signal with an input filter. In some embodiments, the method further comprises filtering out electromagnetic and radio frequency interference from the output voltage with an output filter. Adjusting the switching element based on the feedback algorithm comprises varying a duty cycle of the switching element. In some embodiments, the method further comprises increasing a power factor of the cascade power apparatus with a power factor correction function of the non-isolated converter.

Yet another aspect of the present application is directed to a cascade power apparatus. The apparatus comprises a rectifier for receiving an AC input signal and generating a rectified power signal having an unregulated rectified voltage, a non-isolated converter having a switching element, wherein the non-isolated converter receives the rectified power signal having the unregulated voltage and generates a regulated voltage, an isolated converter coupled with the non-isolated converter for receiving the regulated voltage and generating a converted voltage, a transformer coupled with the isolated converter for receiving the converted voltage and generating an output voltage and an internal controller coupled with an output of the isolated converter for receiving the converted voltage and generating a control signal for adjusting the switching element based on a feedback algorithm, wherein the feedback algorithm is independent of the output voltage. The non-isolated converter is a step-down converter and the regulated voltage is lower than the unregulated voltage. Alternatively, the non-isolated converter is a step-up converter and the regulated voltage is higher than the unregulated voltage. The converted voltage is lower than the regulated voltage. The non-isolated step-down converter is a buck converter. The isolated converter is a half-bridge converter. Adjustment to the switching element controls the output of the non-isolated converter by adjusting a duty cycle of the non-isolated converter. The generated regulated voltage is 50V. The generated unregulated voltage is 200V. The generated output voltage is either 5, 12 or 24V.

Other features of the present invention will become apparent from consideration of the following description taken in conjunction with the accompanying drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

The cascade power system, method and apparatus described herein is designed to provide a more efficient manner of converting power supplies. Unlike the stage based systems of the prior art, the cascade topology of the cascade power system described herein is able to provide a feedback loop that is isolated from the system output thereby simplifying the feedback control algorithm and eliminating the need for output isolating electronics within the feedback loop. Specifically, because the cascade topology enables the feedback loop to measure the system output before it is subjected to the transformer, the controller of the system does not need to compensate for the transformer's effects on the output signal. Further, because this feedback loop is already isolated from the output by the transformer, additional expensive isolating circuitry as used in stage based converters is not needed. Moreover, by configuring an isolated converter in a cascade with a non-isolated converter, the cascade power system is able to gain the benefits of both.

Figure 2:
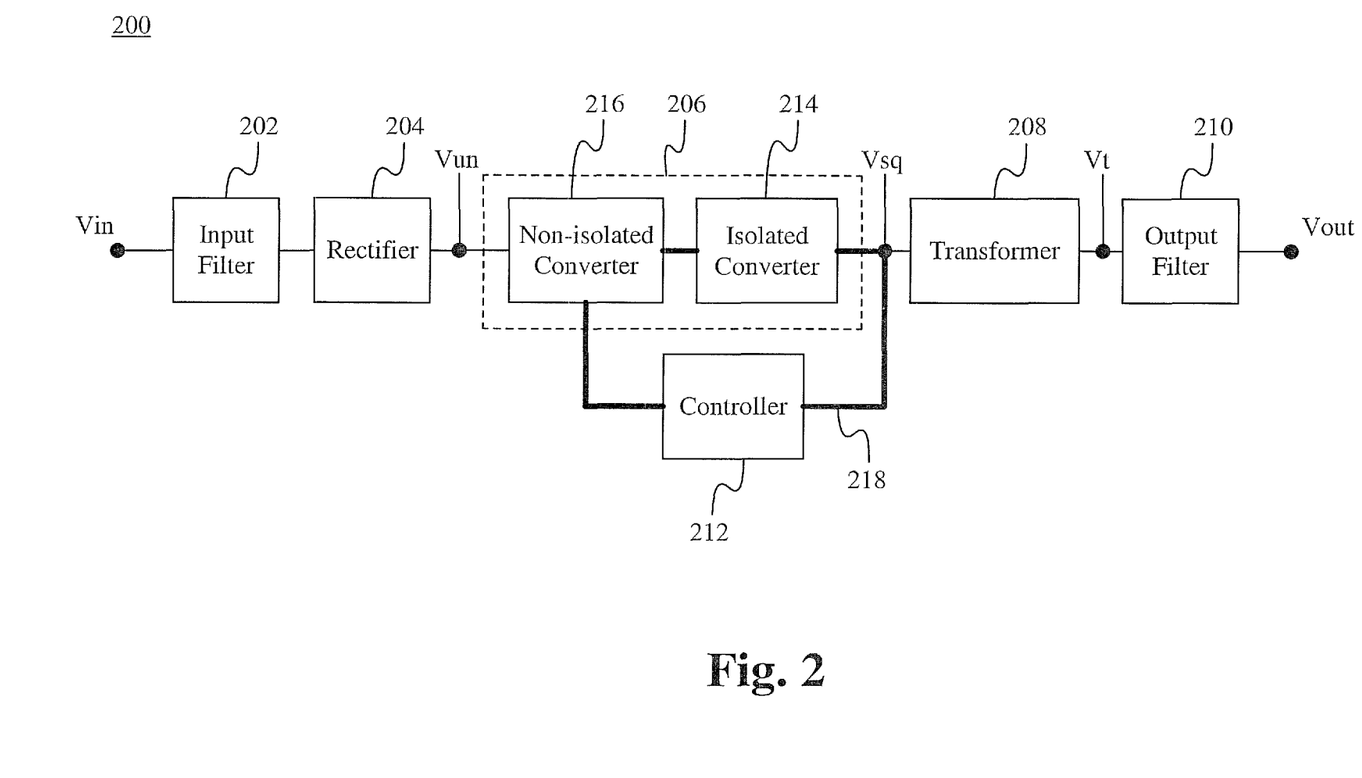
FIG. 2 illustrates a functional block diagram of a cascade power system in accordance with some embodiments of the present application.

FIG. 2 illustrates a functional block diagram of a cascade power system according to some embodiments. The cascade power system 200 of FIG. 2 comprises an input filter circuit 202, a rectifier circuit 204, a converter cascade circuit 206 comprising a non-isolated converter 216 and an isolated converter 214, a transformer 208, an output filter circuit 210 and a controller 212. In some embodiments, the power system 200 comprises any number of additional filters, rectifiers, converters, transformers, controllers and other devices well known in the art such as capacitors, diodes, resistors, inductors, transistors, etc. In some embodiments, the power system 200 comprises additional converters configured to operate as power factor correction (PFC) components. Alternatively, the non-isolated converter 216 operates as a PFC component by ensuring that the input current and a line frequency are in the same phase. The input filter circuit 202 is coupled to a power supply (not shown) and the rectifier circuit 204. In operation, the input filter circuit 202 receives an AC input voltage (Vin) from the power supply and filters out electromagnetic interference (EMI), radio frequency interference (RFI) and other types of noise from the signal Vin such that noise from the power source is able to be minimized, if not eliminated. The input filter circuit 202 outputs the filtered AC voltage to the rectifier circuit 204. The input filter circuit 202 is able to be any circuit capable of effectively filtering out noise as are well known in the art. The rectifier circuit 204 is coupled to the input filter circuit 202 and the converter cascade circuit 206. The rectifier circuit 204 receives the filtered AC voltage from the input filter circuit 202 and converts the filtered AC voltage into unregulated DC voltage (Vun). The rectifier circuit 204 outputs the unregulated DC voltage Vun to the converter cascade circuit 206. In some embodiments, the unregulated DC voltage Vun is approximately 200V. Alternatively, the unregulated DC voltage is any voltage with an absolute value greater than zero. In some embodiments, the rectifier circuit 204 is a diode bridge. Alternatively, the rectifier circuit 204 comprises any type of AC to DC converting circuitry as are well known in the art.

The converter cascade circuit 206 comprises an isolated converter 214 and a non-isolated converter 216. Specifically, the cascade topology of the converter cascade circuit 206 enables the output voltage of the circuit 206 to be kept isolated without the use of isolating circuitry or sacrificing the ability to easily regulate the circuit 206 with the controller 212. Additionally, it is understood that other benefits associated with each of the individual converters 214, 216 are also achieved in the cascade topology. It should be noted that the transformer 208 is able to be considered a component of the isolated converter 214, but has been separated into an individual component for the purposes of this description. The converter cascade circuit 206 is coupled to the rectifier circuit 204, the transformer 208 and the controller 212. The converter cascade circuit 206 inputs the unregulated DC voltage output by the rectifier circuit 204 and the non-isolated stage converter 216 "steps down"/lowers the unregulated DC voltage to a predetermined regulated voltage. In some embodiments, the regulated voltage is approximately 50V. Alternatively, the regulated DC voltage is any voltage less than the unregulated DC voltage input by the converter cascade circuit 206. In other embodiments, the non-isolated converter 216 "steps up"/raises the unregulated DC voltage to a higher regulated DC voltage. In each "step down" embodiment, as a result of "stepping down" the voltage, the cascade power system 200 is able to operate with better efficiency than power systems that use "step up" non-isolated converters. Specifically, this is because, as is known in the art, components with lower voltage ratings are inherently more efficient than those with higher voltage ratings. Furthermore, by operating at a stepped down/lower voltage, the system as a whole is less expensive due to savings on component size.

The isolated converter 214 inputs the regulated DC voltage and outputs a square wave voltage (Vsq) signal that pulses between 0V and the input regulated DC voltage. The pulses are output by the converter cascade circuit 206 to the transformer 208 and the controller 212. In some embodiments, the non-isolated converter 216 is a buck converter. Alternatively, the non-isolated converter 216 is any other type of non-isolated converter as are well known in the art. In some embodiments, the isolated converter 214 is a half-bridge converter. Alternatively, the isolated converter 214 is any type of isolated converter such as a push-pull converter or any other isolated converter well known in the art.

Figure 3:
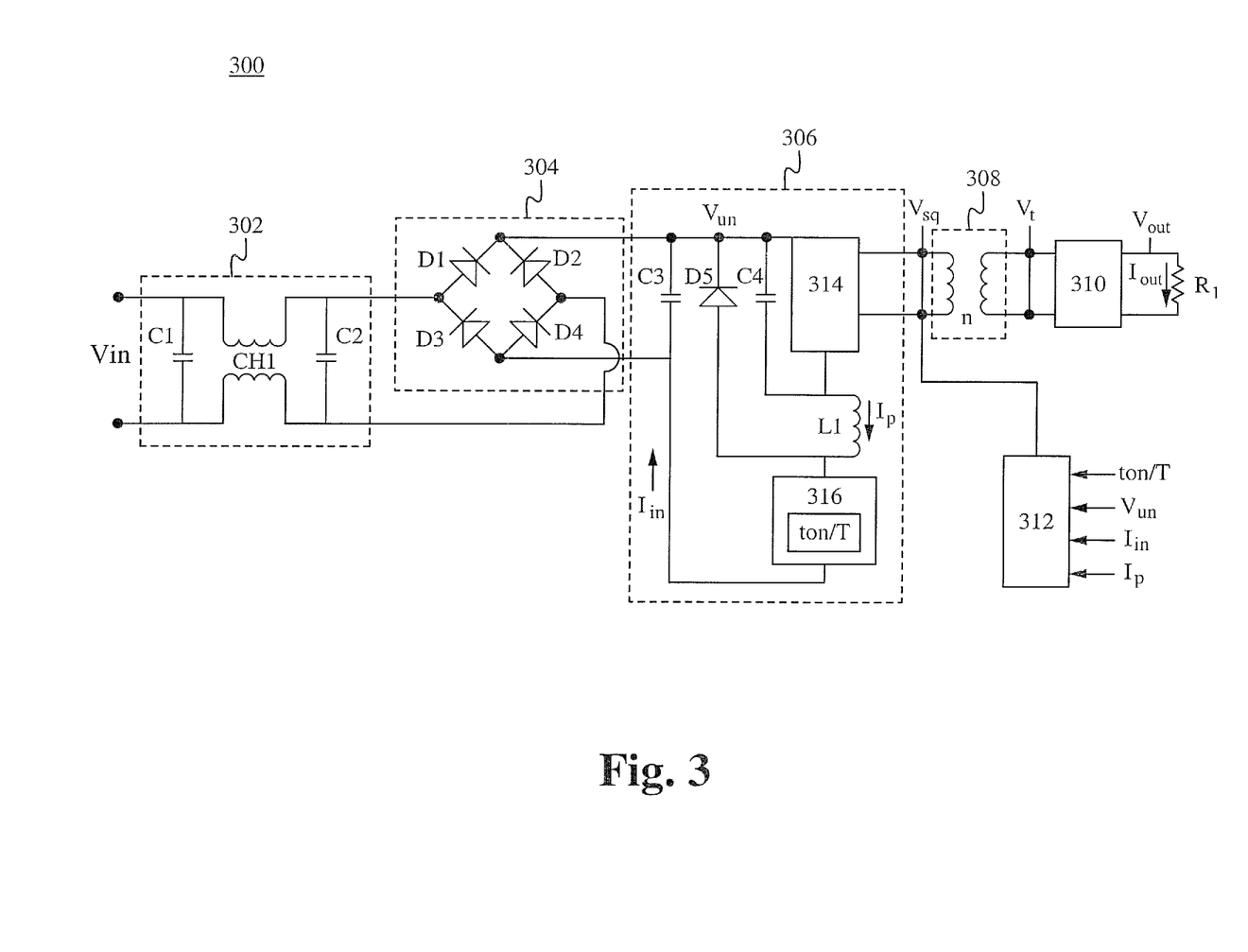
FIG. 3 illustrates a schematic diagram of a cascade power circuit in accordance with some embodiments of the present application.

The controller 212 is able to be any integrated circuit (IC) controller as are well known in the art. In some embodiments, the controller 212 comprises any combination of multiplexers, operational amplifiers, and comparators (not shown). Alternatively, the controller comprises any other combination of circuitry that functions to control the output of the converters 214, 216 as are well known in the art. The controller 212 is coupled to the output voltage of the isolated converter 214 and the non-isolated converter 216. The controller 212, the isolated converter 214 and the non-isolated converter 216 form a feedback loop 218 that is fully isolated from the output voltage Vout by the transformer 208. Two feedback algorithms (1) and (2) can be derived which describe the relationship between the cascade power system 200 output voltage/current Vout, Iout, and the input Vun to the non-isolated converter 216. Due to the cascade topology, these feedback algorithms are derivable despite the lack of a common ground between the controller 212 and the two converters 214, 216. Specifically, the first feedback algorithm (1) enables the controller 212 to accurately regulate the voltage output of the non-isolated converter 216 and thereby regulate the output voltage Vsq of the isolated converter 214, which receives the voltage output of the non-isolated converter. Similarly, the second feedback algorithm (2) enables the controller 212 to accurately regulate the output current of the non-isolated converter 216 and thereby regulate the output current of the isolated converter 214. Regulation of the current and voltage output are controlled by the controller 212 and accomplished by adjusting the duty cycle ratio (ton/T=Δ) of the non-isolated converter 216, wherein ton is the on-time of the converter 216 and T is the period of the converter 216. Specifically, the duty cycle ratio is adjusted based on, as shown in FIG. 3, the output voltage Vsq of the isolated converter 214, the unregulated voltage Vun input to the non-isolated converter 216, the current input to the non-isolated converter Iin, and the peak current Ip through the inductor L1. The measurement/calculation of the duty cycle ratio ton/T and the specific relationship of the duty cycle ratio to the output of the non-isolated converter is well known in the art and varies depending on the type of non-isolated converter. For the exemplary schematic shown in FIG. 3, the feedback algorithms are as follows:

$$Vout = 1.53 * n * Vun * \sqrt{(\Delta/Ip)} \quad (1);$$

$$Iout = 0.78/n * \sqrt{(\Delta/Ip)} \quad (2);$$

wherein Ip is the peak current through inductor L1, Δ is the duty cycle ratio (ton/T) of the non-isolated converter 216, n is the turns ratio of the transformer 208, and Vun is the unregulated rectified voltage received by the non-isolated converter 216 from the rectifier 204. It is understood that the constants "1.53" and "0.78" are application specific, and thus other constants can be used depending on the application and/or the desired output.

Thus, by keeping "√(Δ/Ip)" constant, the controller 212 maintains a substantially constant output voltage or current. Furthermore, because the controller 212 is isolated from the system output Vout, there is no need for the controller 212 to comprise an opto-coupler or other similar isolating circuitry as means of maintaining isolation of the converters and the output Vout. Moreover, by not including the transformer 208 within the "feedback loop," the feedback algorithm 218 is significantly less complex because it does not need to take into account the effects of the transformer 208 on the output signal Vout.

The transformer 208 is coupled to the output of the converter cascade circuit 206 and the output filter 210. The transformer 208 is configured to "step down" the square wave voltage Vsq to a predetermined desired transformer output voltage (Vt). In some embodiments, the desired transformer output voltage is 5V. Alternatively, the transformer output voltage is any other voltage. As is well known in the art, the transformer output voltage Vt is determined and can be adjusted by adjusting the ratio of turns n within the coils of the transformer 208. The transformer output voltage Vt, which is now an AC voltage, is output by the transformer 208 to the output filter circuit 210. The output filter 210 is coupled to the transformer 208 and an output device (not shown). The output filter 210 inputs the transformer AC output voltage Vt and both converts the voltage back to DC as well as filtering out any noise introduced into the voltage signal by the converter cascade circuit 206. This filtered DC output voltage (Vout) is then output to the output device.

FIG. 3 illustrates an exemplary schematic of the cascade power system architecture according to an embodiment. The schematic is substantially similar to the functional block diagram shown in FIG. 2 along with additional details described herein. It is understood that alternative schematics can be used to implement the functional blocks of FIG. 2. The cascade power system circuit 300 comprises an input filter circuit 302, a rectifier circuit 304, a power converter cascade circuit 306 having an isolated converter 314 and a non-isolated converter 316, a transformer 308, an output circuit 310 and a controller 312. The input filter circuit 302 comprises a first capacitor C1 coupled across two independent input lines comprising the AC input voltage Vin and the inputs of a choke element CH1 that functions to filter out unwanted noise. In some embodiments, the choke element CH1 can be a pair of inductors for "smoothing out" ripples/noise in the current. Alternatively, the choke element CH1 can be any suitable filtering element as are well known in the art. The outputs of the choke element CH1 are coupled across a second capacitor C2, the terminals of the second capacitor C2 being further coupled to the output lines of the input filter circuit 302. The input filter circuit 302 filters out noise coming through the input voltage Vin via the choke element CH1 as is well known in the art. Alternatively, other noise filtering circuitry is able to be used in the input filter circuit 302 for filtering the input voltage noise.

The rectifier circuit 304 comprises four diodes D1, D2, D3, and D4, wherein the cathodes of diode D1 and diode D2 are coupled, the anodes of diode D3 and diode D4 are coupled, and the anodes of diode D1 and diode D2 are coupled to the cathodes of diode D3 and diode D4 respectively forming a loop. Further, the first input line is coupled to anode of diode D1 and the cathode of diode D3, the second input line is coupled to the anode of diode D2 and the cathode of diode D4. Finally, the first output line is coupled to the cathode of diode D1 and diode D2, and the second output line is coupled to the anode of diode D3 and diode D4. In this manner, as is well known in the art, the AC input voltage Vin is converted to unregulated DC voltage that is output on the first and second output lines. In some embodiments, the circuit 304 further comprises a capacitor coupled across the rectifier output to "smooth" the output as is well known in the art. Alternatively, other rectifying circuitry can be used as are well known in the art.

The power converter cascade circuit 306 comprises capacitors C3 and C4, diode D5 and inductor L1. The capacitor C3 functions as an input line filter for the non-isolated converter 316. A first terminal of capacitor C3 is coupled to the input unregulated DC voltage from the rectifier circuit 304, a cathode of the diode D5, a first terminal of the capacitor C4 and a first input of the isolated converter 314. A second terminal of the capacitor C3 is coupled to the input ground voltage from the rectifier 304, and the non-isolated converter 316. The diode D5 functions as an output rectifier and filter for the non-isolated converter 316. The cathode of the diode D5 is coupled to the input unregulated DC voltage from the rectifier circuit 304, the first terminal of the capacitors C3 and C4 and the first input of the isolated converter 314. An anode of the diode D5 is coupled to the non-isolated converter 316 and a second terminal of inductor L1. The first terminal of capacitor C4 is coupled to the input unregulated DC voltage from the rectifier circuit 304, the cathode of the diode D5, the first terminal of the capacitor C3 and the first input of the isolated converter 314. The second terminal of capacitor C4 is coupled to the first terminal of inductor L1 and a second input of isolated converter 314. The inductor L1 functions as an energy storage power inductor for the non-isolated converter 316. The first terminal of the inductor L1 is coupled to the second input of the isolated converter 314 and the second terminal of capacitor C4. The second terminal of the inductor L1 being coupled to the anode of diode D5 and the non-isolated converter 316. In some embodiments, the power converter cascade circuit 306 further comprises additional capacitors, inductors, resistors, diodes, transistors, etc.

The controller 312 comprises a plurality of inputs coupled to the duty cycle ratio Δ, the square wave output voltage Vsq, the unregulated output voltage Vun, the input current Iin, and the peak current Ip. For clarity, the actual connections have not been shown, but it should be understood that the labeled inputs of the controller 312 (Δ, Vun, Iin, Ip) are coupled to the corresponding labeled portions of the circuit. Furthermore, as described above, Ip is the peak current across inductor L1, Δ is the duty cycle ratio (ton/T) of the non-isolated converter 316, n is the turns ration of the transformer 308, Iin is the input current of the non-isolated converter 316, Iout is the output current across the output load R1, Vout is the output voltage across the output load R1 and Vun is the unregulated rectified voltage received by the non-isolated converter 316 from the rectifier 304.

The transformer 308 is coupled to the output of the power converter cascade circuit 306 such that the transformer 308 receives the output square wave voltage Vsq. The transformer 308 comprises a type of isolating transformer as are well known in the art. The output of the transformer Vt is coupled with the output filter 310. The output filter 310 comprises a type of noise filtering circuit as are well known in the art. The output of the output filter 310 is coupled with the output load R1 such that the output load R1 receives the output voltage Vout and output current Iout.

Figure 4:
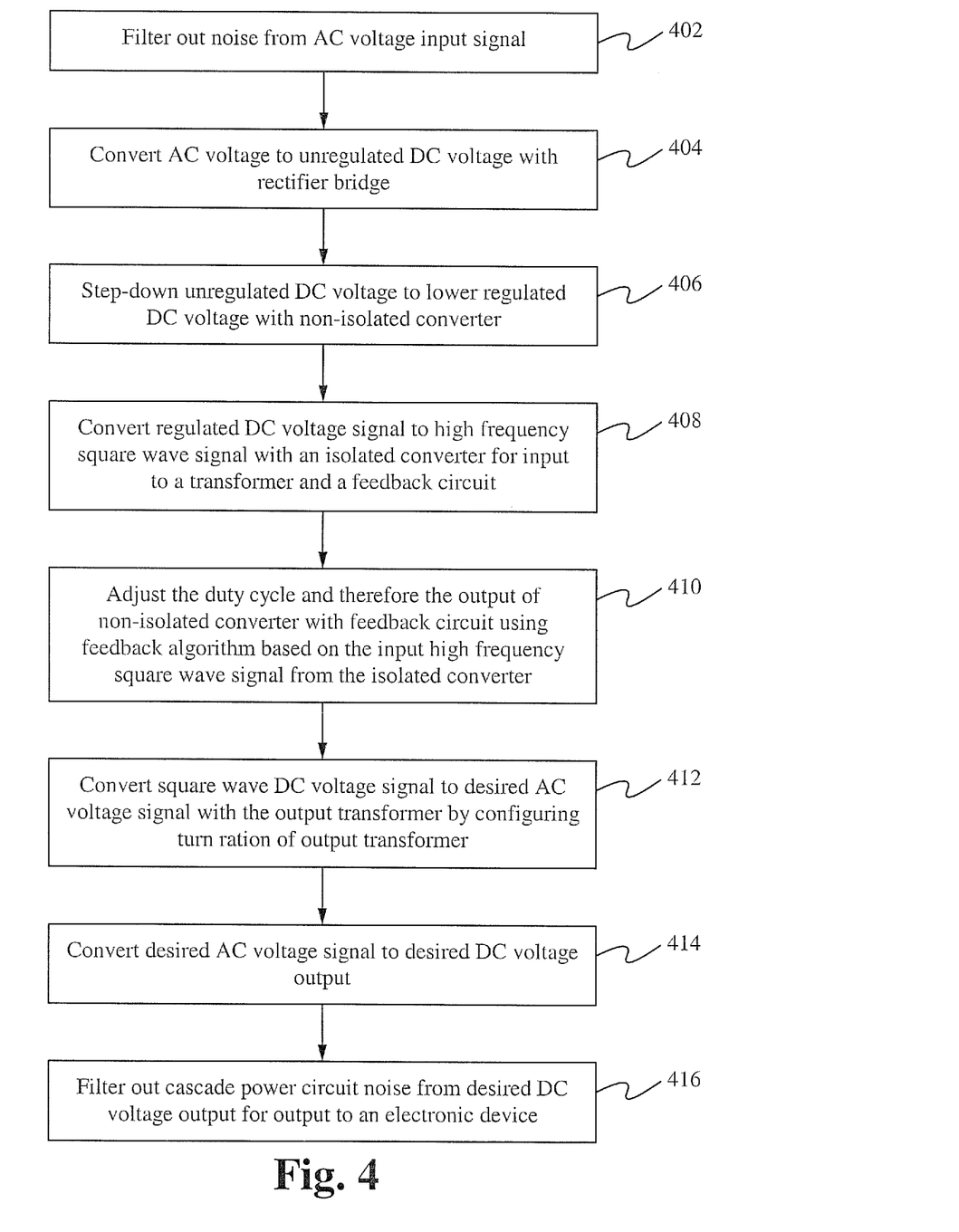
FIG. 4 illustrates a process flow diagram for a method of regulating a cascade power converting system in accordance with some embodiments of the present application.

The operation of the cascade power system will now be discussed in conjunction with a flow chart illustrated in FIG. 4 and described relative to FIG. 2. At the step 402, the input filter circuit 202 filters out noise in the AC voltage input signal Vin. At the step 404, the rectifier circuit 204 inputs the input signal Vin and converts it to an unregulated DC voltage Vun. At the step 406, the non-isolated converter 216 steps-down the unregulated DC voltage to a lower regulated DC voltage for input to the isolated converter 214. Alternatively, the non-isolated converter 216 steps-up the voltage to a higher regulated DC voltage for input to the isolated converter 214. At the step 408, the isolated converter 214 converts the regulated DC voltage output by the non-isolated converter 216 to a high frequency square wave DC voltage signal Vsq for input to the transformer 208 and the controller 212. At the step 410, the controller 212 samples the duty cycle of the non-isolated converter 216, the high frequency square wave DC voltage signal Vsq input from the isolated converter 214, along with the unregulated voltage Vun, the input current Iin and the peak current Ip. At the step 412, the controller 212 adjusts the duty cycle and therefore the output of the non-isolated converter 216 based on the sampled input (Δ, Vun, Vsq, Iin, Ip) using the feedback algorithms (1) and/or (2). At the step 414, the high frequency square wave DC voltage signal Vsq received from the isolated converter 214 is converted to the desired AC voltage signal by configuring the turn ratio n of the output transformer 208. At the step 416, the output filter 210 converts the desired AC voltage signal to a desired DC voltage output Vout. Alternatively, the desired output voltage is not rectified and therefore remains an AC voltage. At the step 418, the output filter 210 filters out cascade power circuit noise or ripple from the desired DC voltage output Vout for output to an electronic device. In some embodiments, one or more of the filtering and/or rectifying steps are not included. Alternatively, one or more additional filtering, rectifying, converting or transforming steps are included.

The method, circuit and system of cascade power system architecture described herein has numerous advantages. Specifically, the cascade power system architecture produces a highly regulated DC output voltage (Vout) from an AC input voltage (Vin). As a result, the output voltage can be kept isolated from the converter cascade circuit without the use of an opto-coupler or other isolating devices, as well as without sacrificing regulation of the converter cascade circuit by the controller. Further, as a result of "stepping down" the voltage, the cascade power system is able to operate with better efficiency than power systems that use "step up" non-isolated converters. Specifically, this is because, as is known in the art, components with lower voltage ratings are inherently more efficient than those with higher voltage ratings. Moreover, because the controller is isolated from the system output Vout, there is no need for the controller to comprise an opto-coupler or other similar isolating circuitry as means of maintaining isolation of the converters and the output Vout. Moreover, by not including the transformer within the "feedback loop," the feedback algorithm is significantly less complex because it does not need to take into account the effects of the transformer on the output signal Vout.

The cascade power system has been described in terms of specific embodiments incorporating details to facilitate the understanding of the principles of construction and operation of the cascade power system. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiments chosen for illustration without departing from the spirit and scope of the cascade power system.

What is claimed is:

1. A cascade power apparatus comprising:
   a. a non-isolated converter having a switching element, wherein the non-isolated converter receives a rectified power signal having an unregulated voltage and generates a regulated voltage;
   b. an isolated converter coupled with the non-isolated converter for receiving the regulated voltage and generating a converted voltage;
   c. a transformer coupled with the isolated converter for receiving the converted voltage and generating an output voltage; and
   d. an internal controller coupled with an output of the isolated converter for receiving the converted voltage and generating a control signal for adjusting the switching element based on a feedback algorithm, wherein the feedback algorithm is independent of the output voltage.

2. The apparatus of claim 1, wherein the non-isolated converter is a step-down converter and the regulated voltage is lower than the unregulated voltage.

3. The apparatus of claim 1, wherein the non-isolated converter is a step-up converter and the regulated voltage is higher than the unregulated voltage.

4. The apparatus of claim 2, wherein the converted voltage is lower than the regulated voltage.

5. The apparatus of claim 4, wherein the converted voltage is a square wave voltage.

6. The apparatus of claim 4, wherein the non-isolated step-down converter is a buck converter.

7. The apparatus of claim 4, wherein the isolated converter is a half-bridge converter.

8. The apparatus of claim 4, further comprising a rectifier for receiving an AC input signal and generating the rectified power signal having the unregulated rectified voltage.

9. The apparatus of claim 8, wherein the rectifier is a diode bridge.

10. The apparatus of claim 4, further comprising an input filter for filtering out electromagnetic and radio frequency interference from the AC input signal.

11. The apparatus of claim 4, further comprising an output filter for filtering out electromagnetic and radio frequency interference from the output voltage.

12. The apparatus of claim 4, wherein adjustment to the switching element controls the output of the non-isolated converter by adjusting a duty cycle of the non-isolated converter.

13. A cascade power system comprising:
   a. an electronic device for receiving an output voltage;
   b. a power supply for generating an AC input signal; and
   c. a power converter coupled between the power supply and the electronic device comprising:

i. a rectifier for receiving the AC input signal and generating a rectified power signal having an unregulated rectified voltage;

ii. a non-isolated converter having a switching element, wherein the non-isolated converter receives the unregulated voltage and generates a regulated voltage;

iii. an isolated converter coupled with the non-isolated converter for receiving the regulated voltage and generating a converted voltage;

iv. a transformer coupled with the isolated converter for receiving the converted voltage and generating the output voltage; and v. an internal controller coupled with an output of the isolated converter for receiving the converted voltage and generating a control signal for adjusting the switching element based on a feedback algorithm, wherein the feedback algorithm is independent of the output voltage.

14. The system of claim 13, wherein the non-isolated converter is a step-down converter and the regulated voltage is lower than the unregulated voltage.

15. The system of claim 13, wherein the non-isolated converter is a step-up converter and the regulated voltage is higher than the unregulated voltage.

16. The system of claim 14, wherein the converted voltage is lower than the regulated voltage.

17. The system of claim 16, wherein the converted voltage is a square wave voltage.

18. The system of claim 16, wherein the non-isolated step-down converter is a buck converter.

19. The system of claim 16, wherein the isolated converter is a half-bridge converter.

20. The system of claim 16, wherein the rectifier is a diode bridge.

21. The system of claim 16, further comprising an input filter for filtering out electromagnetic and radio frequency interference from the AC input signal.

22. The system of claim 16, further comprising an output filter for filtering out electromagnetic and radio frequency interference from the output voltage.

23. The system of claim 16, wherein adjustment to the switching element controls the output of the non-isolated converter by adjusting a duty cycle of the non-isolated converter.

24. A method of regulating a cascade power apparatus comprising:
a. receiving an unregulated rectified voltage at a non-isolated converter comprising a switching element and generating regulated voltage;
b. receiving the regulated voltage at an isolated converter and generating a converted voltage;
c. receiving the converted voltage at a transformer and generating an output voltage; and
d. receiving the converted voltage at an internal controller and generating a control signal that adjusts the switching element based on a feedback algorithm, wherein the feedback algorithm is independent of the output voltage.

25. The method of claim 24, wherein the non-isolated converter is a step-down converter and the regulated voltage is lower than the unregulated voltage.

26. The method of claim 24, wherein the non-isolated converter is a step-up converter and the regulated voltage is higher than the unregulated voltage.

27. The method of claim 25, wherein the converted voltage is lower than the regulated voltage.

28. The method of claim 27, wherein the converted voltage is a square wave voltage.

29. The method of claim 27, wherein the non-isolated step-down converter is a buck converter.

30. The method of claim 27, wherein the isolated converter is a half-bridge converter.

31. The method of claim 27, further comprising receiving an AC input signal at a rectifier and generating an rectified power signal having the unregulated rectified voltage.

32. The method of claim 31, wherein the rectifier is a diode bridge.

33. The method of claim 27, further comprising filtering out electromagnetic and radio frequency interference from the AC input signal with an input filter.

34. The method of claim 27, further comprising filtering out electromagnetic and radio frequency interference from the output voltage with an output filter.

35. The method of claim 27, wherein adjusting the switching element based on the feedback algorithm comprises varying a duty cycle of the switching element.

36. The method of claim 27, further comprising increasing a power factor of the cascade power apparatus with a power factor correction function of the non-isolated converter.

37. A cascade power apparatus comprising:
a. a rectifier for receiving an AC input signal and generating a rectified power signal having an unregulated rectified voltage;
b. a non-isolated converter having a switching element, wherein the non-isolated converter receives the rectified power signal having the unregulated voltage and generates a regulated voltage;
c. an isolated converter coupled with the non-isolated converter for receiving the regulated voltage and generating a converted voltage;
d. a transformer coupled with the isolated converter for receiving the converted voltage and generating an output voltage; and
e. an internal controller coupled with an output of the isolated converter for receiving the converted voltage and generating a control signal for adjusting the switching element based on a feedback algorithm, wherein the feedback algorithm is independent of the output voltage.

38. The apparatus of claim 37, wherein the non-isolated converter is a step-down converter and the regulated voltage is lower than the unregulated voltage.

39. The apparatus of claim 37, wherein the non-isolated converter is a step-up converter and the regulated voltage is higher than the unregulated voltage.

40. The apparatus of claim 38, wherein the converted voltage is lower than the regulated voltage.

41. The apparatus of claim 40, wherein the non-isolated step-down converter is a buck converter.

42. The apparatus of claim 40, wherein the isolated converter is a half-bridge converter.

43. The apparatus of claim 40, wherein adjustment to the switching element controls the output of the non-isolated converter by adjusting a duty cycle of the non-isolated converter.

44. The apparatus of claim 40, wherein the generated regulated voltage is 50V.

45. The apparatus of claim 40, wherein the generated unregulated voltage is 200V.

46. The apparatus of claim 40, wherein the generated output voltage is either 5, 12 or 24V.

* * * * *